United States Patent [19]

Spangler

[11] 4,422,322
[45] Dec. 27, 1983

[54] METHOD AND SYSTEM FOR MEASUREMENT OF ROAD PROFILE

[76] Inventor: Elson B. Spangler, Bloomfield Hills, Mich. 48013

[21] Appl. No.: 372,322

[22] Filed: Apr. 27, 1982

[51] Int. Cl.³ .............................................. G01B 5/28
[52] U.S. Cl. ........................................ 73/105; 73/146
[58] Field of Search ................................. 73/105, 146

[56] References Cited

U.S. PATENT DOCUMENTS

| | | | |
|---|---|---|---|
| 3,151,235 | 9/1964 | Greenshields | 73/105 |
| 3,266,302 | 8/1966 | Spangler et al. | |
| 3,353,404 | 11/1967 | Swift. | |
| 3,888,118 | 6/1975 | Nims | 73/105 |
| 3,983,746 | 10/1976 | Phillips et al. | 73/105 |
| 4,100,795 | 7/1978 | Panette. | |

OTHER PUBLICATIONS

GMR Road Profilometer, A Method for Measuring Road Profile, by Elson B. Spangler and William J. Kelly, Research Publication GMR-452, Dec. 22, 1964.

*Primary Examiner*—S. Clement Swisher
*Attorney, Agent, or Firm*—Barnes, Kisselle, Raisch, Choate, Whittemore & Hulbert

[57] ABSTRACT

Apparatus and method for use on a measurement vehicle to measure road surface profile independently of variations in vehicle velocity over the road surface. Transducers are mounted on the vehicle suspended mass for measuring distance (W-Y) to the road surface and acceleration $\ddot{Y}$ normal to the road surface as the vehicle is propelled over the road surface. A third transducer is responsive to fixed increments ds of vehicle travel over the road surface. Surface profile is determined as a continuous function of the time-independent equation $$W = (W-Y) + \int\int (\ddot{Y}/\dot{V}^2) \, ds \, ds,$$

ps where V is average vehicle velocity over each successive incremental distance ds. A spatial domain filter attenuates profile wavelength components in excess of a desired preselected maximum wavelength.

8 Claims, 6 Drawing Figures

METHOD AND SYSTEM FOR MEASUREMENT OF ROAD PROFILE

The present invention relates to systems and methods for measurement of surface profile, and more particularly to a system and method for measuring the profile of a vehicle travel surface such as a road or runway. Yet more specifically, the invention relates to improvements in the system disclosed and claimed in U.S. Pat. No. 3,266,302.

The term "road" is used herein in a generic sense to include highways, streets and the like commonly travelled by automotive vehicles, runways and other surfaces used by aircraft for take-off and landing, railways, and any other type of surface over which a vehicle may travel.

BACKGROUND OF THE INVENTION

In accordance with the teachings of U.S. Pat. No. 3,266,302, a measurement vehicle is propelled over a road surface, and surface profile (W) is measured as a conjoint function of displacement of the vehicle suspension system (W−Y) and the twice-integrated output ($\ddot{Y}$) of an accelerometer carried by the vehicle. The disclosed system is described as effecting profile measurement with respect to a plane of reference, defined by inertia of the vehicle, over a total frequency range of road surface undulations determined at lower frequencies by accelerometer response characteristics and at higher frequencies by the vehicle suspension displacement transducer. However, the signal/noise response capabilities of the accelerometer at lower frequencies and any steady-state offset in the electrical output of both transducers, coupled with the described double integration, limit the capabilities of the system to the extent disclosed in the referenced patent.

To overcome the low frequency response difficulties which inhere in the accelerometer/double-integration technique, it was proposed in Spangler et al, "A Method of Measuring Road Profile", GMR-452, General Motors Corp. (1964) to subject the accelerometer output to a time domain highpass filter for attenuating the low frequency response prior to time domain double integration. However, since the spatial frequency content of the road profile varies in proportion to vehicle velocity, the provision of the highpass time domain filter causes the measured profile to vary as a function of vehicle speed. This problem was alleviated to some extent by providing a highpass filter with a step-wise variable natural or cutoff frequency thereby to accommodate step-wise differing but constant vehicle speed.

A further improvement which is prior art to the present invention implemented time domain digital processing techniques in place of, but exactly analogous to, the analog time domain processing techniques proposed in the above-referenced patent and GMR paper. This improvement embodied the capacity for user-input of desired frequency (or wavelength) measuring capability and contemplated vehicle speed. A corresponding highpass filter natural frequency was computed and applied to the accelerometer output in time domain computation of road profile. Although the technique so implemented effectively replaces the earlier step-wise selectable filter with a continuously variable filter, it was still necessary to maintain a constant vehicle velocity during the measurement process.

OBJECTS AND SUMMARY OF THE INVENTION

An object of the present invention is to provide a method and system of the described type which provide a profile output having a constant spatial frequency content independent of vehicle speed and/or variations in vehicle speed.

Another and more specific object of the invention is to provide a profile measurement method of the type described which is readily adaptable for either analog or digital implementation, and to provide analog and digital apparatus implementing such method.

A more general object of the invention is to provide an improved and reliable method and apparatus for measuring surface profile, with particular adaptation to road surface profile, which remedy some or all of the aforementioned deficiencies and shortcomings of the prior art.

The foregoing and other objects are accomplished in accordance with the invention by providing a system and method which measure road profile in the spatial domain rather than the time domain. Specifically, a transducer is responsive to rotation of a road-contacting wheel for initiating a road profile sample measurement at preselected distance intervals ds along the road surface. Profile W is then measured in accordance with the equation $$W = (W-Y) + \int\int (\ddot{Y}/V^2)\, ds\, ds, \qquad (1)$$

where the quantity (W−Y) is a measure of displacement of the "sprung inertial vehicle" mass relative to the road surface, $\ddot{Y}$ is acceleration of the "vehicle sprung inertial" mass normal to the road surface and V is vehicle velocity in the direction of travel. The quantity ($\ddot{Y}/V^2$) is a time-indepedent measure of spatial acceleration of the sprung inertial mass of the measurement vehicle. Thus, the units of all quantities in equation (1) are time-independent units of distance. Velocity V may be measured at each distance interval using a suitable transducer, or may be determined by the equation $$V = (ds/dt) \qquad (2)$$

where dt is the time required to travel the distance interval ds.

Spatial acceleration given by the expression ($\ddot{Y}/V^2$) is subjected to a highpass filtering operation to attenuate any low frequency and steady-state components of the transducer signals. However, the filter cutoff frequency, which is in time-independent spatial frequency units of radians per unit length, remains constant during the measurement cycle (following initialization) and produces a road profile measurement having the desired frequency (wavelength) information content regardless of vehicle velocity and/or changes in vehicle velocity.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
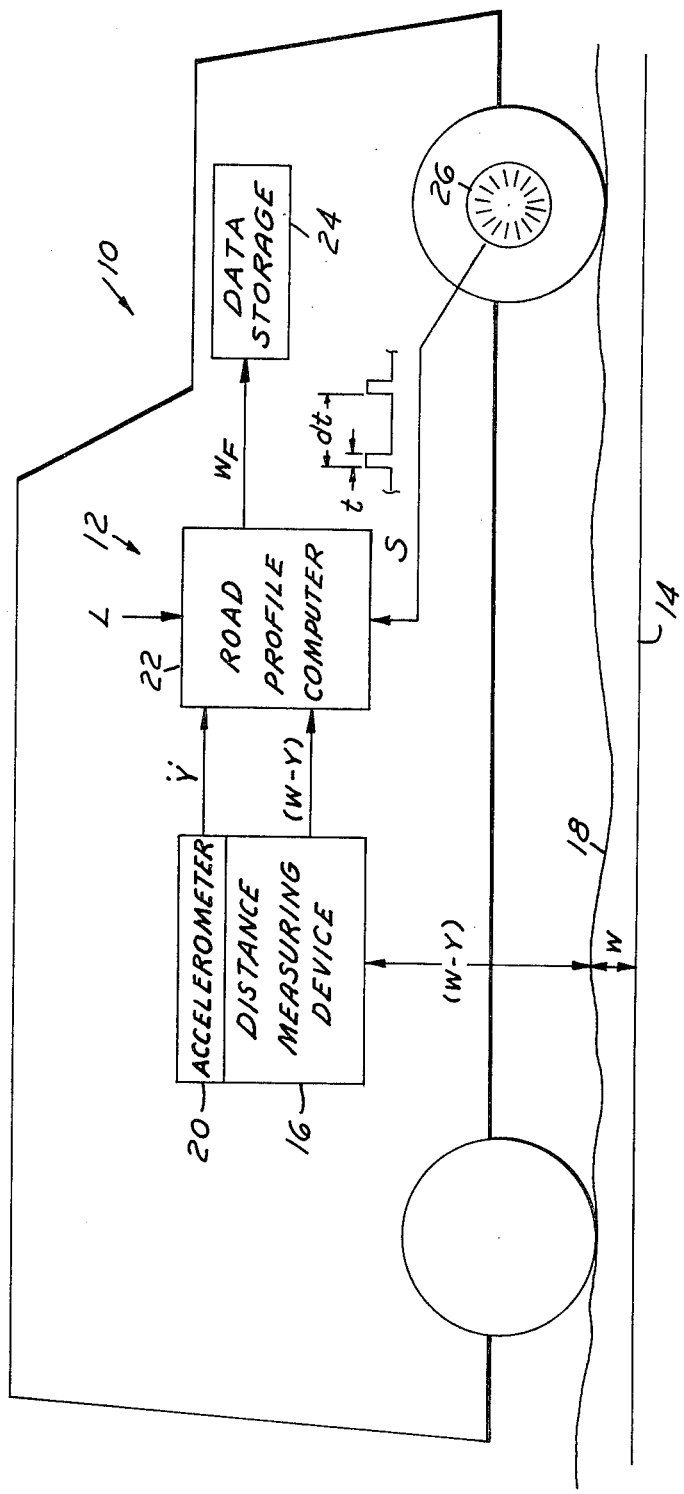
FIG. 1 is a schematic diagram of a vehicle equipped with a road profilometer in accordance with the invention.

FIG. 1 illustrates a vehicle 10 equipped with a road profile measurement apparatus or profilometer 12 in accordance with the invention for measuring road profile W as a distance from an imaginary plane 14 defined by the inertia element of an accelerometer 20 mounted on the sprung vehicle mass. Apparatus 12 includes a distance measuring device or transducer 16 mounted with the accelerometer 20 on the sprung mass of vehicle 10 for measuring the distance (W−Y) to the actual road surface 18, which distance varies as a function of the vehicle suspension system (not shown) as vehicle 10 travels over the road surface. Device 16 may take the form of a road following wheel and a variable resistor as shown in the above-referenced patent mounted on a separate towed vehicle. Ultrasonic and other non-contact transducers have also been proposed and may be mounted on vehicle 10 per se.

The accelerometer 20 mounted with displacement transducer 16 and responsive to acceleration of the sprung mass of the measurement vehicle in a direction perpendicular to inertial reference plane 14 to provide the acceleration signal $\ddot{Y}$. Accelerometer 20 and distance transducer 16 direct their respective outputs to a road profile computer indicated generally at 22. The above-referenced patent and GMR publication disclose prior art embodiments of computer 22 as previously discussed, and also discuss in detail background theory and operation of road profilometry in general. The patent and publication are incorporated herein by reference for such background discussions. FIGS. 2–6 to be discussed in detail hereinafter illustrate various preferred embodiments of computer 22 in accordance with the present invention. The output $W_F$ of computer 22, which indicates profile W suitably spatially filtered to highlight spatial frequency (wavelength) content of interest, is fed to a data storage device 24, which may comprise a strip chart recorder, magnetic tape recorder, etc.

In accordance with the present invention, computer 22 operates exclusively in the spatial domain. In the preferred embodiment herein disclosed, such spatial domain operation is carried out under control of a train of distance pulses S received from a road travel distance measuring transducer 26. Transducer 26 may be suitably mounted to one of the vehicle wheels as shown, or to a separate "fifth wheel", so as to provide a pulse S of fixed time duration t in response to travel of the vehicle over a predetermined fixed distance ds. Transducer 26 may comprise electro-optical couplers responsive to a suitably apertured disc for providing pulse S of duration t at a rate (1/ds) of twenty per foot (approximately 1.5 pulses per centimeter) of travel, for example. In this example, therefore, each pulse S indicates a distance ds of 0.05 feet (1.524 cm). Time interval dt between successive pulses S will vary with vehicle speed.

Figure 2:
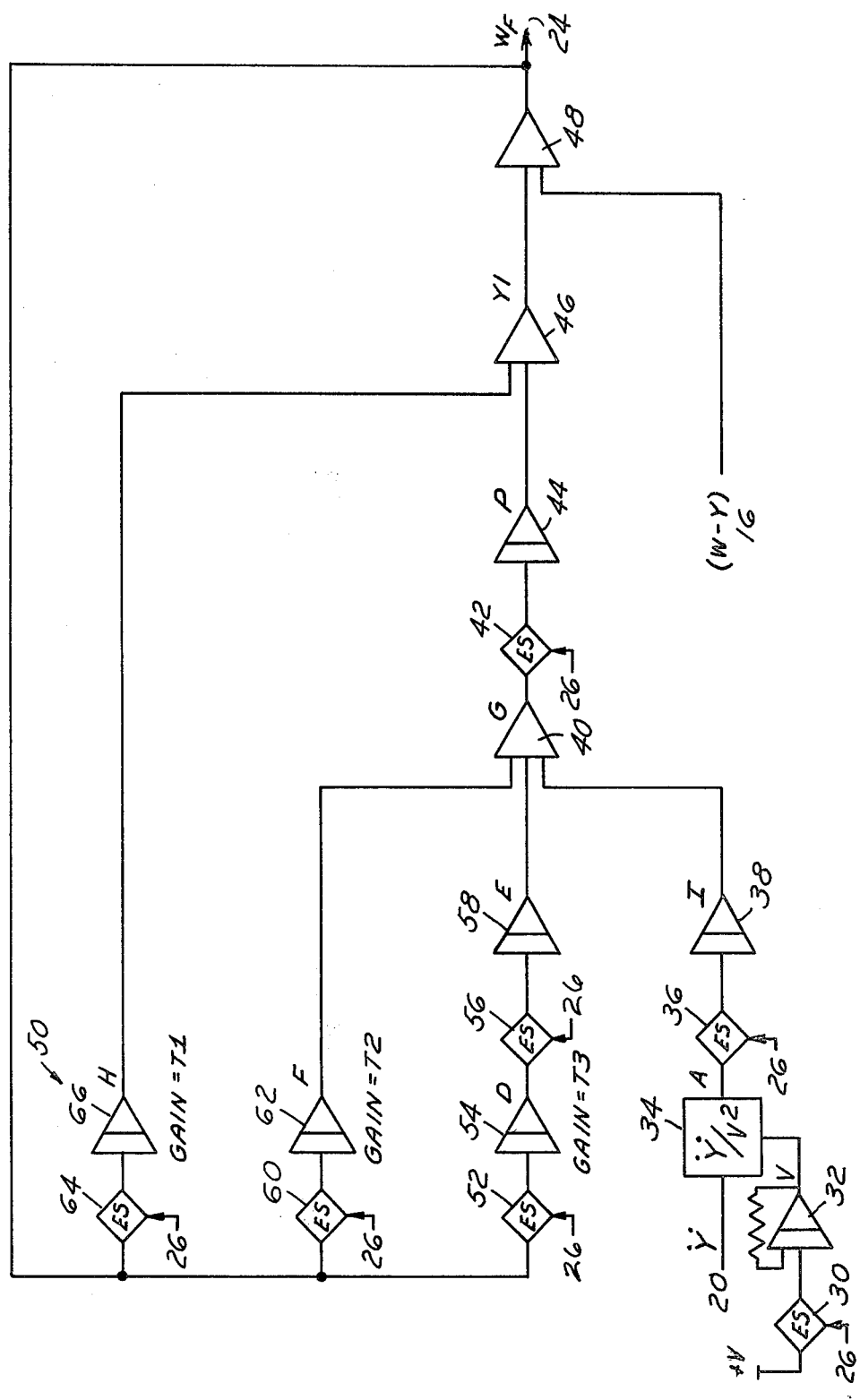
FIG. 2 is a functional block diagram of an analog embodiment of the road profile computer shown in block form in FIG. 1.

FIG. 2 is a functional block diagram of an analog embodiment of computer 22 for providing the filtered output $W_F$ as a function of inputs S, $\ddot{Y}$ and (W−Y) previously discussed. An electronic switch 30 is responsive to transducer 26 for connecting a voltage source to an integrator 32, the frequency of such connections, and therefore the output V of integrator 32, being a function of vehicle velocity. Math module 34 receives the accelerometer signal $\ddot{Y}$ and velocity signal V from integrator 32, and provides an output A as a function of the quantity $(\ddot{Y}/V^2)$. This quantity, which is an expression of acceleration in the spatial domain, is fed through an electronic switch 36 to an integrator 38. The output I of integrator 38 is fed to one input of a summing amplifier 40.

The output G of amplifier 40 is fed through an electronic switch 42 to an integrator 44 which has an output P connected to one input of a summing amplifier 46. The output Y1 of amplifier 46, which may be visualized in FIG. 1 as corresponding to the total distance from devices 16 and 20 to the inertial reference plane 14, is fed to a summing amplifier 48. Amplifier 48 receives a second input (W−Y) from device 16, and provides at its output the profile measurement $W_F$ as a function of the sum (W−Y)+Y1.

The highpass spatial domain analog filter of the embodiment of FIG. 2 is illustrated by the general reference numeral 50. The output $W_F$ of amplifier 48 is fed back through the electronic switch 52 to an integrator 54 which has a gain factor T3. The output D of integrator 54 is fed through an electronic switch 56 to an integrator 58, which has an output E fed to a second input of summing amplifier 40. The output $W_F$ of amplifier 48 is also fed through an electronic switch 60 to an integrator 62 having gain factor T2, and which has an output F fed to a third input of amplifier 40. The output $W_F$ of amplifier 48 is also fed through an electronic switch 64 and an integrator 66 with gain factor T1, the latter having an output H connected to the second input of summing amplifier 46.

The gains of integrators 66, 62, 54 correspond to the spatial highpass filter constants T1, T2, T3, which are respectively given by the following equations:

$$T1 = 2 \cdot (2\pi/L) \tag{3}$$

$$T2 = 2 \cdot (2\pi/L)^2 \tag{4}$$

$$T3 = (2\pi/L)^3 \tag{5}$$

where L (FIG. 1) is the maximum desired profile measurement wavelength preselected by an operator. (Means for presetting the gains of integrators 66, 62, 54 may be of conventional type and are not shown). The maximum desired wavelength L may be selected, for example, based upon the type of vehicle which will travel over the measured surface, normal traffic speed and passenger comfort. A maximum wavelength of 300 feet (91.4 meters) would be appropriate for medium size automobiles traveling 55 miles/hour (88.5 km/hr), while a wavelength of 550 feet (152.5 meters) may be appropriate for a commercial size passenger aircraft traveling at a runway speed of 100 miler/hr (160.9 kn/hr). Electronic switches 30, 36, 42, 52, 56, 60 and 64 are all identically responsive to pulses S from transducer 26 as previously described for connecting the corresponding input to the corresponding output for the fixed time duration t upon occurrence of each pulse S.

Figure 3:
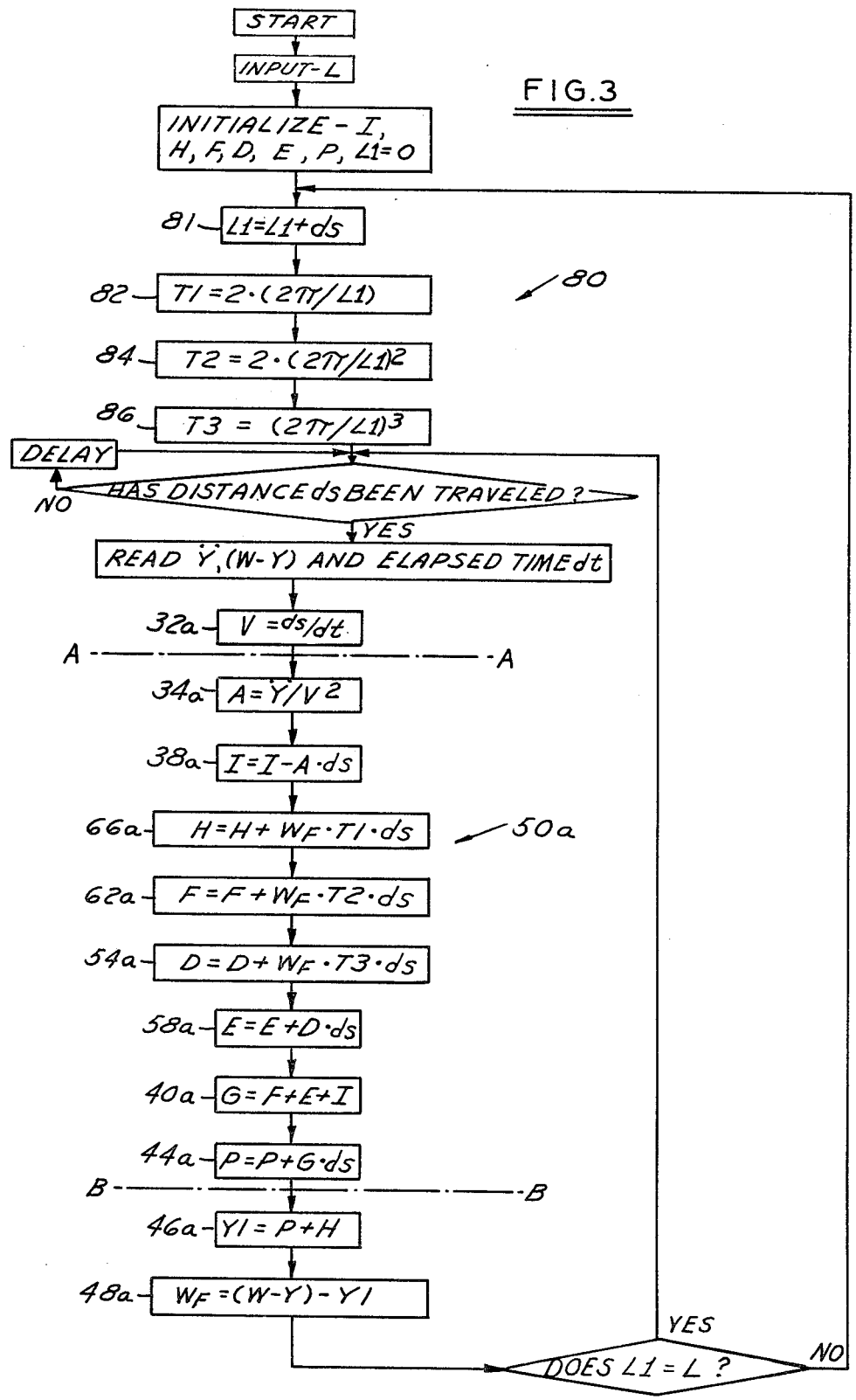
FIG. 3 is a flow chart of a digital embodiment of the road profile computer of FIG. 1 comprising a programmed digital computer.

FIG. 3 illustrates the flow chart of a programmed digital computer embodiment of road profile computer 22 in FIG. 1. Letters and symbols used in FIG. 3, and in the succeeding drawings, correspond to letters and symbols previously discussed in connection with FIGS. 1 and 2. Likewise, to facilitate appreciation of the analogous relationship between FIGS. 2 and 3, and to forestall unnecessary repetition, stages in the flow chart of FIG. 3 which illustrate digital computation steps corresponding to analog stages in FIG. 2 are identified by corresponding reference numerals followed by the subscript a.

The process illustrated in FIG. 3 is characterized by an initialization technique illustrated by the stages 80 which allows spatial profile measurement on start-up independently of profiles previously measured, and by means of which the road profile measured during start-up has a spatial frequency content that exactly matches the spatial frequency filtering capability of the highpass digital filter 50a (corresponding to analog filter 50 in FIG. 2) at any given point in the initialization process. The initialization process ultimately sets the highpass spatial filter constants T1, T2 and T3 to correspond to the selected maximum desired measurement wavelength L, and reduces the effect of steady-state offset and low frequency noise in the output of accelerometer 20 and transducer 16 (FIG. 1) in the final output.

Immediately upon start-up, all variables I, H, F, D, E and P previously discussed are set at zero. L1, which in FIG. 3 is a variable which controls spatial frequency filter constants T1, T2 and T3, is initially set at zero and then incremented to ds at 81. Filter constants T1, T2 and T3 are computed accordingly at stages 82, 84, 86 per preceding equations (3) to (5). Upon occurrence of an S pulse from transducer 26 (FIG. 1), accelerometer output Y is sampled, distance measuring device output (W−Y) is sampled and time dt elapsed since the last S signal is read from a suitable internal clock. Velocity V is then determined as ds/dt, and digital computation of variables A, I, H, F, D, E, G, P, Y1 and $W_F$ proceed as shown and previously discussed. Note that inclusion of distance ds in computation of integrated variables I, H, F, D, E, and P is analogous in terms of operation in the spatial domain to inclusion of the S-operated electronic switches at the inputs of the analog integrators for computing the corresponding variables in FIG. 2.

Continuing the initialization process, i.e. until the variable L1 is equal to the user input L, L1 is incremented by the amount ds, and the filter constants T1, T2 and T3 are correspondingly recomputed on each pass—i.e. following each occurrence of an S pulse and computation of $W_F$. When L1 is finally equal to L, the filter constants are at their final value, and $W_F$ is effectively computed upon occurrence of each S pulse from transducer 26 (FIG. 1). A complete listing of instructions for implementing the process of FIG. 3 is BASIC source code is as follows:

```
100: ! START
110: INPUT L
120: I = 0
130: H = 0
140: F = 0
150: D = 518
160: E = 0
170: P = 0
180: L1 = 0
190: L1 = L1 + S ! S = ds
200: T1 = 2*(2*PI/L1)
210: T2 = 2*(2*PI/L1) ^ 2
220: T3 = (2*PI/L1) ^ 3
230: ! HAS DISTANCE ds BEEN TRAVELED?
240: IF NO THEN 230
250: IF YES THEN 260
260: ! READ ACCELERATION (y2)
270: ! READ DISPLACEMENT (W−Y)
280: ! READ ELAPSED TIME (dt)
290: V = S/T ! T = dt
300: A = Y2/V ^ 2
310: I = I − A*S
320: H = H + W1 + T1*S ! W1 = Wf
330: F = F + W1 + T2*S
340: D = D + W1 + T3*S
350: E = E + D*S
360: G = F + E + I
370: P = P + G*S
380: Y1 = P + H
390: W1 = W − Y − Y1 ! W1 = Wf
400: IF L1 = L THEN 230
410: GO TO 190
420: END
```

Figure 4:
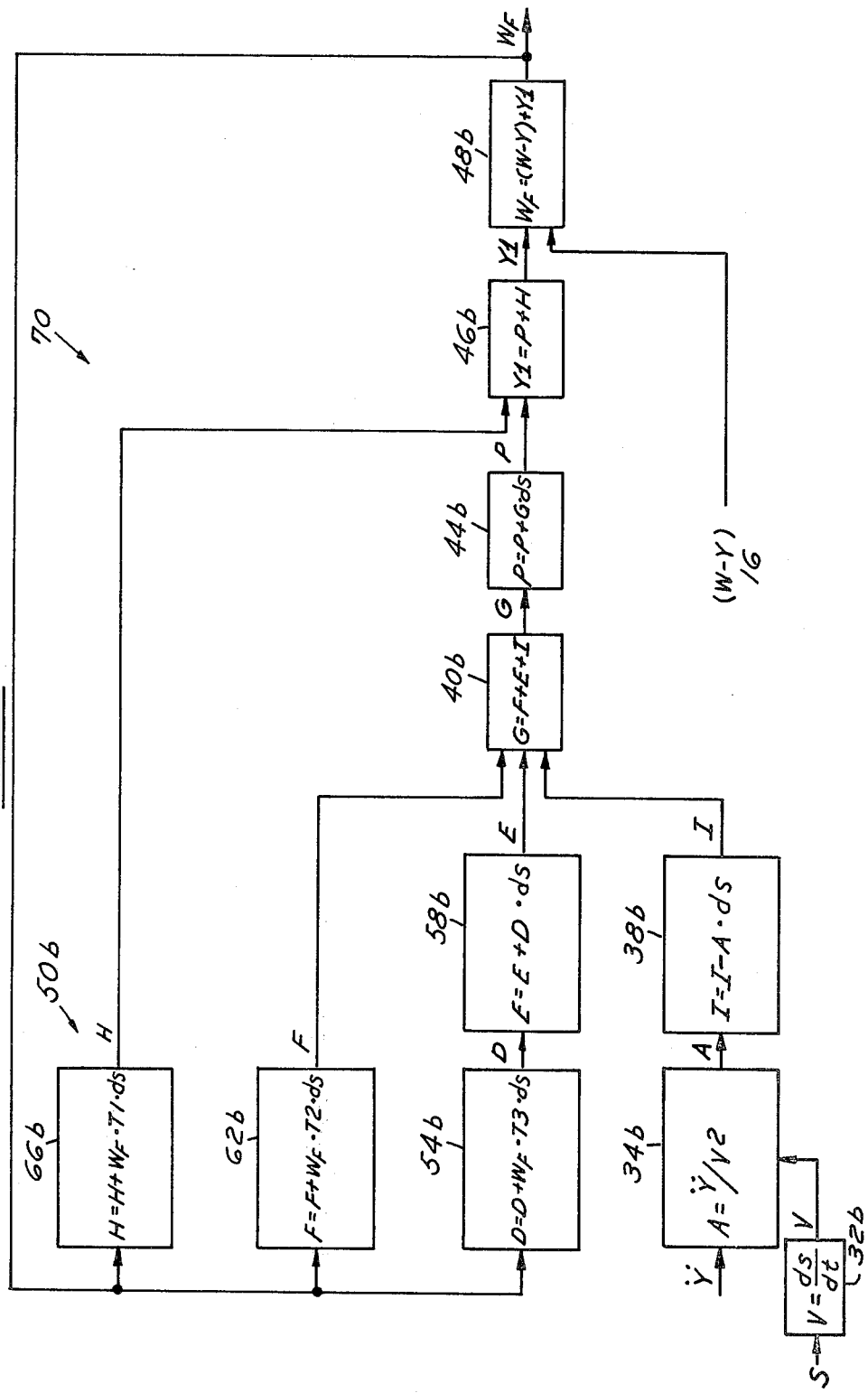
FIG. 4 is a functional block diagram of a digital embodiment of the road profile computer of FIG. 1 corresponding to FIG. 3 but comprising discrete electronic hardware.

FIG. 4 is a functional block diagram of a discrete-circuit digital embodiment 70 of road profile computer 22 (FIG. 1). The elements and variable outputs are laid out in FIG. 4 in correspondence with corresponding analog elements and outputs in FIG. 2. The blocks of FIG. 4 are identified by reference numerals which find appropriate correspondence in FIGS. 2 and 3, followed by the letter b, including specifically the computation steps of FIG. 3 and highpass filter elements 50b of FIG. 4 which effect highpass spatial filtering in accordance with the invention. Operation of the embodiment of FIG. 4 will be evident from the foregoing discussion. It will be appreciated that the hardware for implementation of the previously-discussed initialization process 80 (FIG. 3) is not shown in FIG. 4. Hardware necessary for such implementation will be evident to the artisan.

Figure 5:
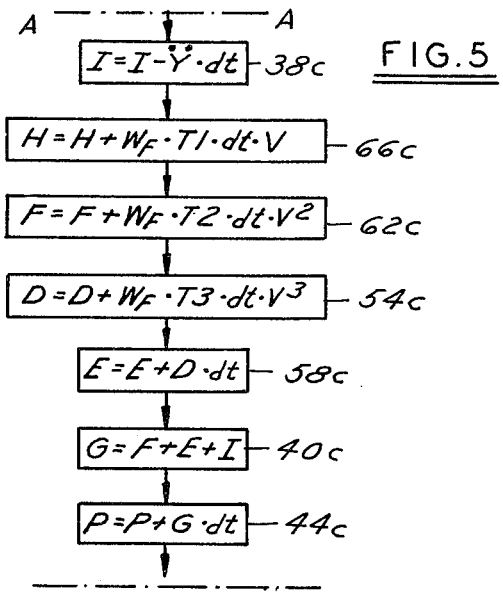
FIG. 5 is a fragmentary flow chart of a modification to FIG. 3 between lines A—A and B—B.
Figure 6:
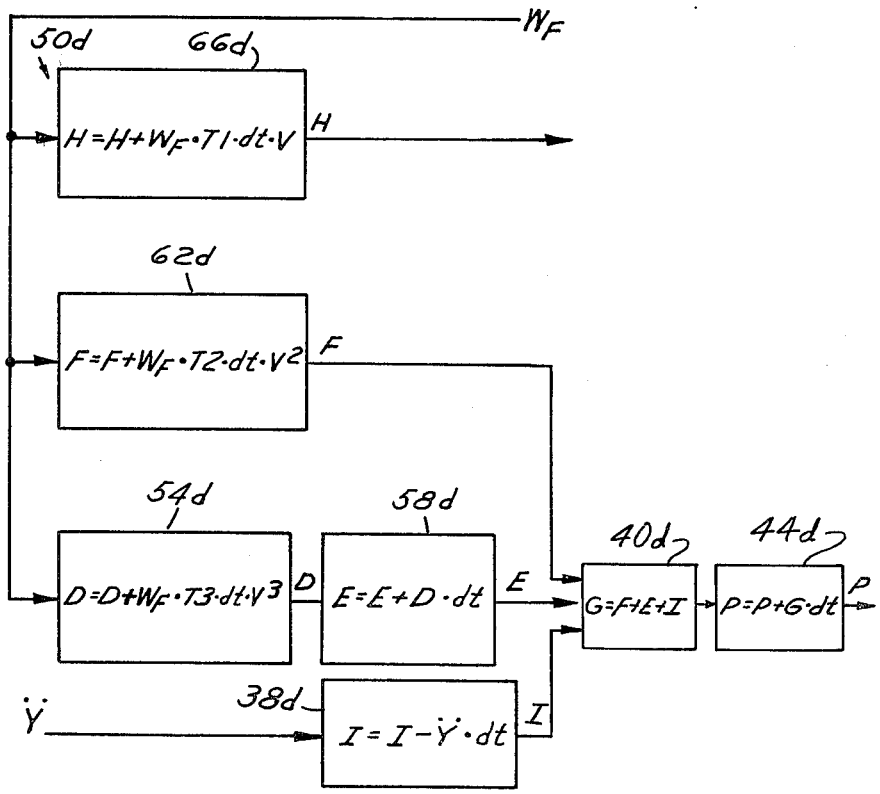
FIG. 6 is a fragmentary functional block diagram of a corresponding modification of FIG. 4.

FIGS. 5 and 6 illustrate respective modifications to FIGS. 3 and 4 wherein the highpass filtering operation is carried out in a "quasi spatial" domain in accordance with the invention utilizing vehicle velocity V and elapsed time dt between S pulses in the spatial domain computations. Stages or elements in FIGS. 5 and 6 which find correspondence in FIGS. 3 and 4 are indicated by respectively identical reference numerals followed by the letters c and d.

Specifically, FIG. 5 illustrates a modification to FIG. 3 between the lines A—A and B—B in the latter. Note that the terms dt·V, dt·V² and dt·V³ replace the constant ds in computation of variables H, F and D respectively. This modification introduces temporal units (1/sec) in variables H, F and D, which are then removed by multiplication by time dt in computation of variables H, F, D, E and P. To implement the modification of FIG. 5 in the previous source code listing instructions 290 and 300 are eliminated, and instructions 310–370 are replaced as follows:

```
310: I = I − Y2*T ! T = dt
320: H = H + W1*T1*T*V ! W1 = Wf
330: F = F + W1*T2*T*V ^ 2
340: D = D + W1*T3*T*V ^ 3
350: E = E + E*T
360: G = F + E + I
370: P = P + G*T
```

FIG. 6 illustrates a "quasi spatial" domain highpass filter 50d for use in place of filter 50b in FIG. 4. The modifications of FIGS. 5 and 6 are fully analogous to the pure spatial domain embodiments previously described, and are fully as effective in measuring road profile independently of vehicle speed and/or changes in vehicle speed in accordance with the invention.

The invention claimed is:

1. In a method of measuring road surface profile which includes the steps of providing a vehicle having a suspended mass adapted to be propelled over a road surface, measuring distance from the suspended mass to the road surface as the vehicle is propelled over the road surface, determining acceleration of said suspended mass with respect to the road surface as the vehicle is propelled over the road surface, and determining road surface profile as a combined function of said distance and acceleration, the improvement for measuring said road surface profile independently of variations in vehicle speed over said road surface comprising the steps of determining spatial domain acceleration of said suspended mass as a conjoint function of acceleration of said suspended mass with respect to said road surface and distance traveled over said road surface, and then determining said road surface profile in the spatial domain as a conjoint function of said spatial domain acceleration, said distance to the road surface.

2. The method set forth in claim 1 comprising the additional steps of identifying a maximum desired profile measurement wavelength, and then filtering said spatial domain acceleration and said distance to the road surface in the spatial domain to attenuate profile measurement wavelengths greater than said maximum desired wavelength.

3. Apparatus for measuring road surface profile comprising a measurement vehicle adapted to be propelled over a road surface to be measured and including a suspended mass, distance measuring means mounted on said suspended mass for providing a first signal as a function of distance to the road surface as said vehicle is propelled over the road surface, acceleration measuring means mounted on said suspended mass for providing a second signal as a function of acceleration of said suspended mass in a direction normal to the road surface as said vehicle is propelled over the road surface, means responsive to vehicle travel over the road surface for providing a repetitive third signal indicative of vehicle travel over fixed distance increments, time-independent means responsive to said third signal for integrating said second signal with respect to said third signal in the spatial domain, and means for indicating road surface profile as a combined function of said first signal and said integrated second signal and independently of variations of velocity of said vehicle over said road surface.

4. The apparatus set forth in claim 3 further comprising spatial domain lowpass filter means responsive to said indicating means to attenuate spatial components of said road profile greater than a selected maximum wavelength.

5. The method set forth in claim 2 comprising the additional step during initial operation of establishing a cutoff wavelength of ds for said filtering operation, and progressively increasing said cutoff wavelength in correspondence with distance traveled over said road surface.

6. Apparatus for measuring road surface profile comprising a suspended mass adapted to be propelled with respect to said road surface, first means mounted on said mass for providing a signal (W−Y) as a function of distance between said suspended mass and the road surface, second means mounted on said suspended mass for providing a signal $\ddot{Y}$ as a function of acceleration of said suspended mass in a direction normal to the road surface, third means adapted to be responsive to travel of said suspended mass over the road surface for providing a signal indicative of each incremental distance ds of travel over the road surface, fourth means responsive to said third means for determining average velocity V of said mass over each successive said incremental distance ds, and fifth means responsive to said first, second, third and fourth means for indicating road surface profile W as a continuing function of the time-independent equation $$W=(W-Y)+\int\int(\ddot{Y}/V^2)ds\,ds.$$

7. The apparatus set forth in claim 6 wherein said fifth means includes spatial domain filter means for attenuating spatial components of said road surface profile W above a predetermined wavelength.

8. The apparatus set forth in claim 7 further comprising means responsive to said third means and adapted during initial operation of said apparatus to increment the cutoff wavelength of said spatial domain filter means from ds to said predetermined wavelength in increments of length ds.

* * * * *